May 26, 1925.

S. L. BERRY 1,539,458

COOKER AND COOLER

Filed March 9, 1922    2 Sheets-Sheet 1

WITNESSES.
Anna Berry.

INVENTOR
Seneca Lucien Berry.

May 26, 1925.  S. L. BERRY  1,539,458
COOKER AND COOLER
Filed March 9, 1922  2 Sheets-Sheet 2

WITNESSES.
Anna Berry.

INVENTOR.
Seneca Lucien Berry

Patented May 26, 1925.

1,539,458

UNITED STATES PATENT OFFICE.

SENECA LUCIEN BERRY, OF SUNNYVALE, CALIFORNIA, ASSIGNOR, BY MESNE ASSIGNMENTS, TO ANDERSON-BARNGROVER MFG. CO., OF SAN JOSE, CALIFORNIA, A CORPORATION OF CALIFORNIA.

COOKER AND COOLER.

Application filed March 9, 1922. Serial No. 542,381.

*To all whom it may concern:*

Be it known that I, SENECA LUCIEN BERRY, a citizen of the United States, residing at Sunnyvale, in the county of Santa Clara and State of California, have invented certain new and useful Improvements in Cookers and Coolers, of which the following is a specification.

My invention relates to that class of cooking apparatus in which sealed cans, containing the material to be processed, are passed continuously into, through and out of a tank in which heat is either applied by steam or hot water or extracted by means, usually, of water.

The object of my invention is to provide a mechanism simpler in construction, steadier in operation and more accessible for inspection and cleaning than has been accomplished heretofore.

Figure 1:
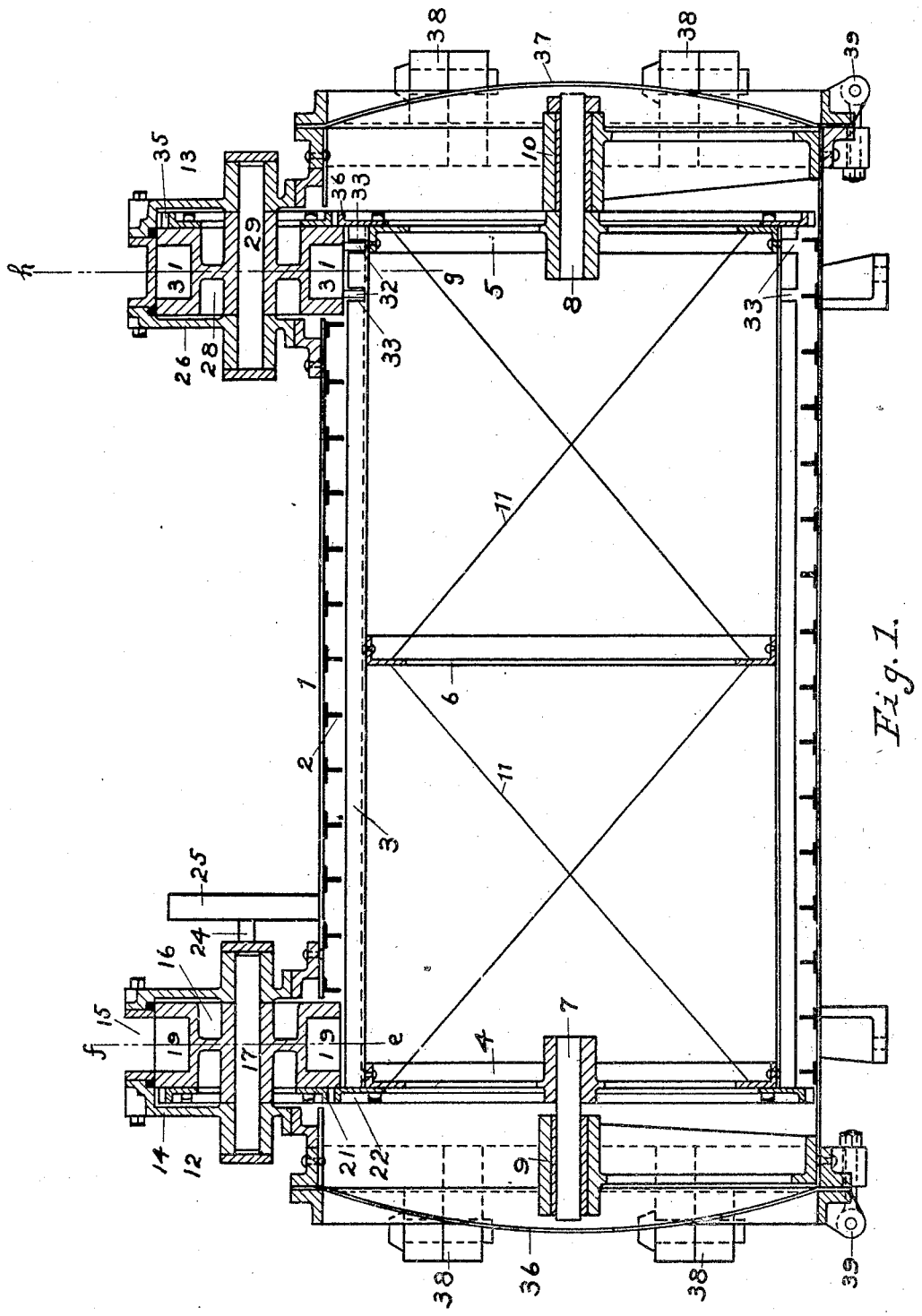

The mechanism by means of which these and other objects are attained is fully described hereinafter and shown in the drawings, in which, Fig. 1, is a cross section in elevation on the lines *a—b*, Fig. 2 and *c—d*, Fig. 3.

Figure 2:
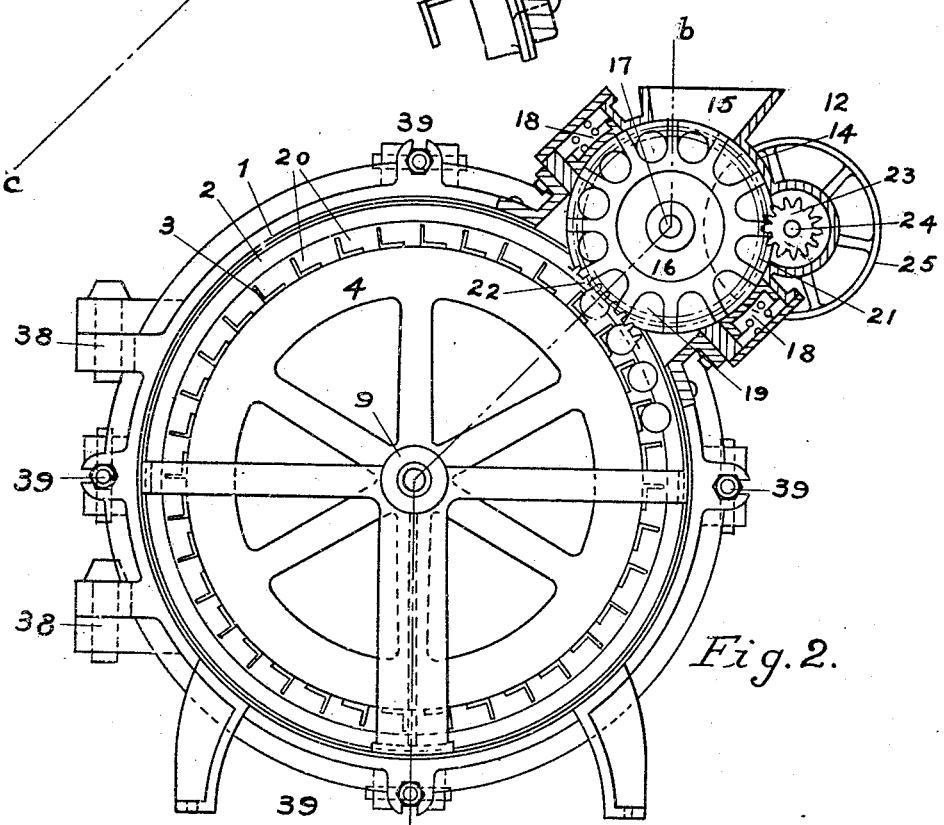

Fig. 2, an end elevation, with the end plate or door removed, of the feed end of the cooker, with the feed mechanism cross sectioned on the line *e—f*, Fig. 1.

Figure 3:
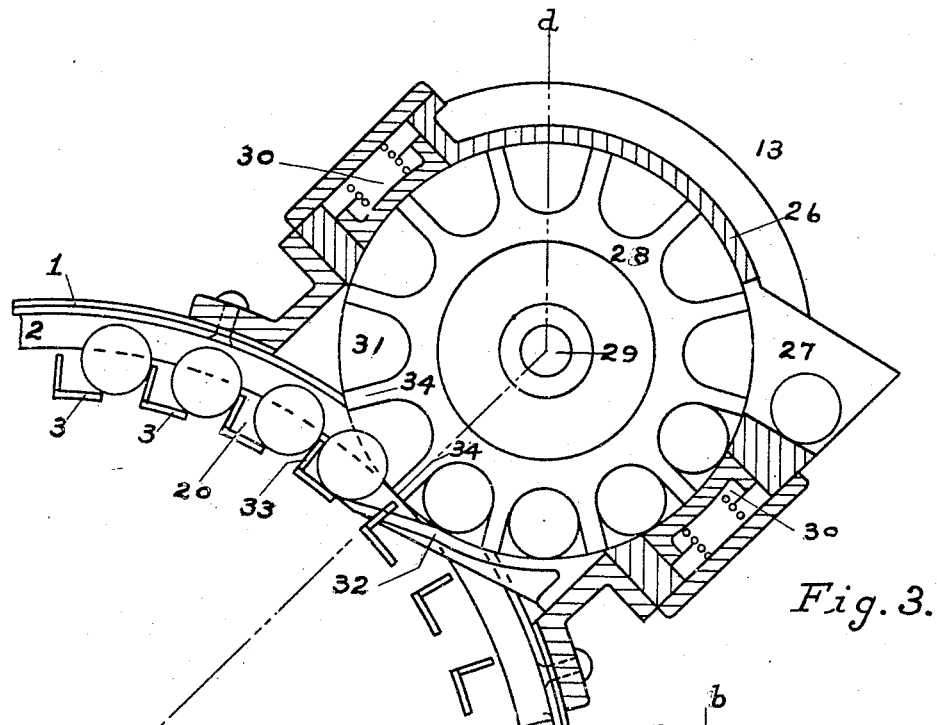

Fig. 3, a cross section of the discharge mechanism on the line *g—h*, Fig. 1.

The mechanism described belongs to that class known as "pressure cookers" since means are provided to prevent undue escape of steam from the tank containing steam under pressure greater than atmospheric. Such a machine may be operated under any pressure desired, including atmospheric and less, and is thus adaptable to the processing of all food products.

The valve shown herein has been fully described in my application for patent for valves for pressure cookers, Serial No. 381,814, filed May 17, 1920, wherein the driving means shown were exterior to the tank, while in the mechanism herein shown such means are within the tank.

Means for introducing water or steam and apparatus for controlling the temperature or amount of steam or water are not shown as such are in common use.

In the drawings, 1 is the shell of the tank, within which is secured the spirally wound T section 2, which with the longitudinal angle sections 3 form the can carrying means. The members 3 are secured to end heads 4—5 and intermediate ring 6, while the end heads 4—5 are provided with shafts 7—8 supported by and revolving in bearings 9—10, located within the tank and which have extensions or arms connecting them to the shell 1. Truss rods 11 serve to stiffen the combination of parts 3–4–5–6–7–8, known as the "reel", which, by its revolution, carries the cans along the spiral path from the feed mechanism 12 to the discharge mechanism 13. The construction of this reel has been described in my co-pending application for patent for reels for cookers, Serial No. 534,604, filed Feb. 6, 1922.

The feed mechanism 12 consists of the valve housing 14, having an inlet opening 15 and communicating with the interior of the tank, the rotatable pocketed can carrying valve 16, shaft 17 and packing means 18—18.

For successful operation it is necessary that the pockets 19 in the valve 16 register with the spaces 20 in the reel and that this registration be maintained under all conditions of load and varying frictional resistances. To obtain this condition I have secured to the valve 16, a gear 21, and to the end head 4 a gear 22 coacting therewith. This arrangement secures the closest cooperation between the valve pockets 19 and the reel spaces 20 and gives assurance that it will remain so permanently. In Fig. 2, the gear 21 is shown by dotted lines to prevent obscuring other parts and of the gear 22 a short section only is shown for the same reason. The cans drop by gravity from the pockets 19 to the reel spaces 20.

One method of driving the cooker is shown in the gear 23, shaft 24 and pulley 25. The gear 23 coacts with gear 21 and through it drives gear 22, secured to the reel, thereby imparting the required motion to the reel independent of the shafts 7—8.

The discharge mechanism 13 consists of the valve housing 26, communicating with the interior of the tank and provided with an outlet opening 27, the rotatable can carrying valve 28, shaft 29 and packing means 30—30.

To transfer the cans from the reel spaces 20 to the pockets 31 of the valve 28, I have provided the fingers 32—32, secured to the housing 26, and which pass through slots 33—33 cut in the radial portion of the angle shaped members 3, to a position under the advancing can. The cans are forced up said fingers 32—32 by the radial portion of the members 3 until they reach the zone of action of the walls 34 between the pockets 31, which complete the operation of causing the cans to enter the valve 28, by which they are carried to the discharge opening 27. It is very necessary that the correct registration of the reel pockets 20 with the valve pockets 31 be maintained. This I have secured by the gears 35—35 fastened respectively to the valve 28 and reel head 5, and which, coacting the one with the other, cause the valve 28 to be responsive to the movement of the reel at the head 5.

To render the mechanism readily accessible for inspection and cleaning I have provided end doors 36—37, supported by hinges 38 and held steam tight, when closed, by clamps 39. The most active cause of deterioration in cookers of this type is the rusting of iron found in a closed vessel filled, at times, with hot water or steam and which remains closed when not in use. There being no opportunity for drying out the interior, rusting action is intense. This is entirely obviated by my provision of doors which can be readily opened at the conclusion of the day's work.

What I claim is:

A pressure cooker comprising a cooking chamber having openings therein, a valve housing mounted over each of the openings, a supporting bearing mounted in the chamber adjacent each end, a cylindrical conveyor rotatably carried by and between the supporting bearings and operable within the chamber, a valve operable in one of the housings for feeding cans to the conveyor, a valve operable in the other housing for receiving cans from the conveyor, a gear secured to each of the valves and confined within the housings, a gear secured to each end of the cylindrical conveyor within the chamber, said last mentioned gears meshing with the valve gears, and doors connected to the ends of the chamber, said doors entirely confining the supporting bearings, conveyor and gears secured to the conveyor within the chamber.

SENECA LUCIEN BERRY.

Witnesses:
 IDA TRUBSCHENCK,
 ANNA BERRY.